United States Patent
Johnson (10) Patent No.: US 8,773,948 B2
(45) Date of Patent: Jul. 8, 2014

(54) METHODS AND APPARATUS TO DETERMINE SLOWNESS OF DRILLING FLUID IN AN ANNULUS

(75) Inventor: David Linton Johnson, Somerville, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 542 days.

(21) Appl. No.: 13/245,881

(22) Filed: Sep. 27, 2011

(65) Prior Publication Data

US 2013/0075158 A1    Mar. 28, 2013

(51) Int. Cl.
G01V 1/50 (2006.01)
G01V 1/44 (2006.01)

(52) U.S. Cl.
CPC ...................................... *G01V 1/44* (2013.01)
USPC .......................................................... 367/31

(58) Field of Classification Search
CPC .............. G01V 1/44; G01V 1/48; G01V 1/50
USPC ..................................................... 361/25–32
See application file for complete search history.

(56) References Cited

U.S. PATENT DOCUMENTS

| | | | |
|---|---|---|---|
| 4,594,691 A * | 6/1986 | Kimball et al. | 367/32 |
| 5,278,805 A * | 1/1994 | Kimball | 367/32 |
| 5,331,604 A | 7/1994 | Chang et al. | |
| 5,359,324 A | 10/1994 | Clark et al. | |
| 5,485,431 A | 1/1996 | Johnson et al. | |
| 5,587,966 A * | 12/1996 | Kimball et al. | 367/31 |
| 5,661,696 A * | 8/1997 | Kimball et al. | 367/31 |
| 6,308,137 B1 | 10/2001 | Underhill et al. | |
| 6,611,761 B2 * | 8/2003 | Sinha et al. | 702/6 |
| 6,631,327 B2 * | 10/2003 | Hsu et al. | 702/6 |
| 6,817,229 B2 | 11/2004 | Han et al. | |
| 6,957,572 B1 | 10/2005 | Wu | |
| 7,095,676 B2 | 8/2006 | D'Angelo et al. | |
| 7,257,489 B2 * | 8/2007 | Hsu et al. | 702/6 |
| 7,660,196 B2 * | 2/2010 | Saiki et al. | 367/31 |
| 7,698,066 B2 * | 4/2010 | Huang et al. | 702/14 |
| 7,764,572 B2 * | 7/2010 | Wu et al. | 367/31 |
| 2005/0126777 A1 | 6/2005 | Rolovic et al. | |
| 2005/0261835 A1 * | 11/2005 | Wang | 702/6 |
| 2006/0018190 A1 | 1/2006 | Brooks | |

(Continued)

OTHER PUBLICATIONS

Henri-Pierre Valero, Hugues Djikpesse, and Bikash Sinha, "Estimation of Borehole Fluid Slowness using Sonic Array Waveforms", SEG Houston 2009 International Exposition and Annual Meeting, pp. 361-365.

*Primary Examiner* — John Fitzgerald
(74) *Attorney, Agent, or Firm* — Daryl R. Wright; Jody DeStefanis (57) ABSTRACT

Methods and apparatus to determine slowness of drilling fluid in an annulus are described. An example method of determining slowness of drilling fluid in an annulus of a borehole in a formation includes obtaining a first slowness of the drilling fluid in the annulus and measuring with a downhole tool slownesses of the formation based on the first slowness. The example method also includes determining a first compressibility of the formation based on the slownesses of the formation and a first density of the formation and calculating a second density and a second compressibility of the drilling fluid in the annulus based on the first density and the first compressibility. The method also includes calculating a second slowness of the drilling fluid in the annulus based on the second density and the second compressibility.

22 Claims, 4 Drawing Sheets

(56) References Cited

U.S. PATENT DOCUMENTS

| | | |
|---|---|---|
| 2006/0120217 A1 | 6/2006 | Wu et al. |
| 2006/0285437 A1* | 12/2006 | Sinha et al. .................... 367/37 |
| 2007/0022803 A1 | 2/2007 | DiFoggio et al. |
| 2007/0215388 A1 | 9/2007 | Kirk et al. |
| 2008/0262736 A1 | 10/2008 | Thigpen et al. |
| 2009/0101432 A1 | 4/2009 | Hsu |
| 2009/0105957 A1 | 4/2009 | Hsu et al. |
| 2009/0257307 A1 | 10/2009 | Valero et al. |

* cited by examiner

METHODS AND APPARATUS TO DETERMINE SLOWNESS OF DRILLING FLUID IN AN ANNULUS

BACKGROUND

During sampling and/or drilling operations, sonic or acoustic measurements may be obtained using a downhole tool to determine formation parameters, for example. These formation parameters may be used to obtain a better understanding of the formation.

When making acoustic measurements to determine formation parameters in a logging-while-drilling (LWD) environment, the acoustic properties of the drilling fluid in the annulus surrounding the drill string may be quantified to enable a more accurate determination of the formation properties. In other words, the affect of the drilling fluid on the manner in which acoustic signals propagate away from and toward an acoustic LWD device may be accounted for when calculating or otherwise determining the formation properties or parameters from such propagated signals. It is relatively simple to measure directly the properties of drilling fluid within a tool string or drill collar. However, due to the presence of rock cuttings, the properties of the drilling fluid in the annulus are different than those of the drilling fluid within the tool string or drill collar and directly measuring the properties of the drilling fluid in the annulus is very difficult.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An example method of determining slowness of drilling fluid in an annulus of a borehole in a formation includes obtaining a first slowness of the drilling fluid in the annulus and measuring with a downhole tool slownesses of the formation based on the first slowness. The example method also includes determining a first compressibility of the formation based on the slownesses of the formation and a first density of the formation and calculating a second density and a second compressibility of the drilling fluid in the annulus based on the first density and the first compressibility. The method also includes calculating a second slowness of the drilling fluid in the annulus based on the second density and the second compressibility.

An example system to determine slowness of drilling fluid in an annulus of a borehole in a formation includes a downhole tool having acoustic apparatus to measure at least slownesses of the formation and a processing unit to: determine a first compressibility of the formation based on the slownesses of the formation and a first density of the formation; calculate a second density and a second compressibility of the drilling fluid in the annulus based on the first density and the first compressibility; and calculate a slowness of the drilling fluid in the annulus based on the second density and the second compressibility.

An example logging-while-drilling tool to determine slowness of drilling fluid includes acoustic apparatus to measure at least slownesses of the formation and a processing unit to: determine a first density and a first compressibility of the formation based on the slownesses of the formation; calculate a second density and a second compressibility of the drilling fluid in the annulus based on the first density and the first compressibility; and calculate a slowness of the drilling fluid in the annulus based on the second density and the second compressibility.

BRIEF DESCRIPTION OF THE DRAWINGS

Embodiments of systems and methods of determining parameter values in a downhole environment are described with reference to the following figures. The same numbers are used throughout the figures to reference like features and components.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The examples described herein relate to methods, systems and apparatus to more accurately determine slowness of drilling fluid in an annulus than many known apparatus and methods. A more accurate determination of slowness of drilling fluid in an annulus can be used in conjunction with acoustic formation measurement or analysis devices to more accurately determine formation properties such as shear slowness or, more generally, formation slowness.

In general, the examples described herein enable the measured properties of drilling fluid within a tool string or drill collar (i.e., internal drilling fluid), where the tool string is suspended in a borehole adjacent a formation for purposes of performing LWD, for example, to be corrected to accurately estimate the properties of drilling fluid in an annulus surrounding the tool string. More specifically, as set forth in more detail below, the correction of the properties of the internal drilling fluid may be based on a rate of penetration of drilling (ROP) and a flow rate of the drilling fluid in the annulus. In particular, the ROP can be used to determine an amount of rock cuttings generated in a given amount of time and, thus, when combined with the flow rate of the drilling fluid, a concentration or volume fraction of rock cuttings suspended in the drilling fluid in the annulus can be determined. The volume fraction of rock cuttings suspended in the drilling fluid can be used to estimate the density and compressibility of the drilling fluid in the annulus based on the density and compressibility of the internal drilling fluid (i.e., the drilling fluid within the tool string or drill collar). The estimated density and compressibility of the drilling fluid in the annulus can then be used to calculate an estimated slowness of the drilling fluid in the annulus. This estimated slowness of the drilling fluid in the annulus can then be used to improve the accuracy of formation measurements made by an acoustic formation analysis tool (e.g., an acoustic LWD tool), as these measurements are made by passing acoustic signals through the drilling fluid in the annulus, which affects these measurements as noted above.

In one example described herein, an iterative technique may be used to improve the accuracy of the estimate of the slowness of the drilling fluid in the annulus and, thus, the accuracy of the acoustic measurements of the formation properties that are affected by or based on that estimate of drilling fluid slowness. In this example, a LWD tool may be lowered into a borehole adjacent a formation to be evaluated. The LWD tool may be configured to perform acoustic measurements to determine various formation parameters including, for example, shear slowness and/or compressional slowness. To perform such measurements, the LWD tool may require a value for the density and speed of sound for the drilling fluid in the annulus between the LWD tool and the wall of the borehole. More generally, the LWD tool may require the slowness of the drilling fluid in the annulus. However, initially, the characteristics of the drilling fluid in the annulus may be unknown. Thus, to initiate the measurement process for the LWD tool, an initial value for the slowness of the drilling fluid in the annulus may be assumed. Such an assumed initial value may be based on typical historical slowness values for similar formations and/or drilling scenarios. Alternatively, the assumed initial value can be equal to or otherwise based on a measured slowness of the internal drilling fluid (i.e., the drilling fluid within the LWD tool or drill collar of the LWD tool). Regardless of the manner in which the initial slowness value is provided, the LWD tool can then perform a measurement to determine a slowness of the formation based on the assumed initial value of the slowness of the drilling fluid in the annulus. The measured slowness of the formation, along with a measurement of the formation density, can then be used to determine the compressibility of the formation. The formation density measurement may be obtained using any suitable methods including non-acoustic means (e.g., LWD measurements). The density and compressibility of the formation can then be used along with a volume fraction of rock cuttings to correct the measured density and compressibility of the drilling fluid within the LWD or drill collar of the LWD tool (e.g., measured at the Earth's surface and/or downhole within the LWD tool) to arrive at a corrected density and compressibility of the drilling fluid in the annulus. The corrected density and compressibility of the drilling fluid in the annulus can then be used to determine an improved estimate of the slowness of the drilling fluid in the annulus. This improved estimate of the slowness of the drilling fluid in the annulus is then used for any subsequent measurement of formation properties by the LWD tool. The foregoing process of measuring formation slowness with the LWD tool and calculating an improved accuracy estimate of the slowness of the drilling fluid in the annulus, which is then used for a subsequent formation slowness measurement, may be repeated a predetermined number of times or until the difference between successive estimates of the slowness of the drilling fluid in the annulus is smaller than a threshold.

Figure 1:
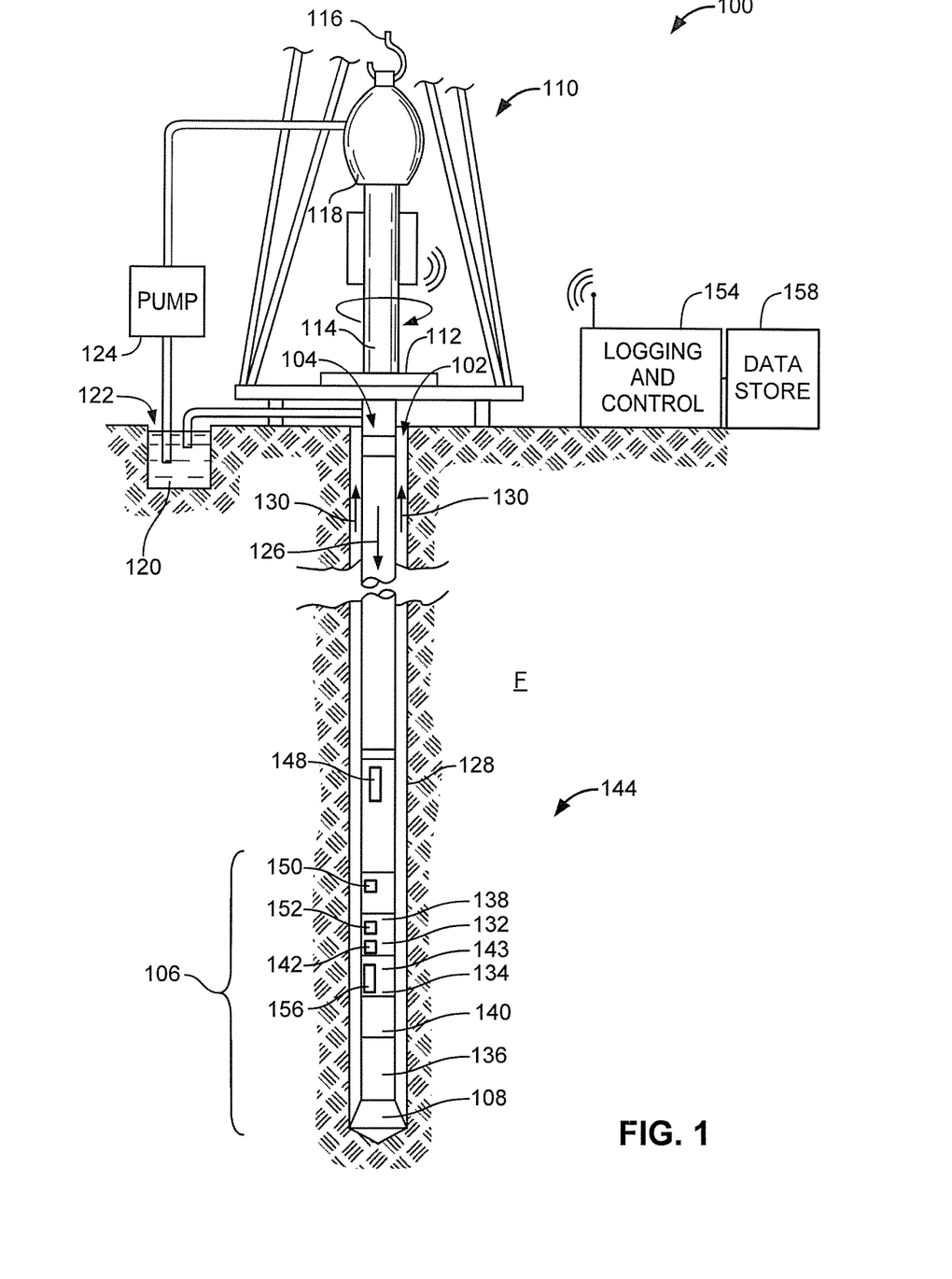
FIG. 1 depicts an example wellsite drilling system.

FIG. 1 illustrates a wellsite system 100 in which the examples described herein can be employed. The wellsite system 100 can be onshore or offshore. In this example, a borehole 102 is formed in a subsurface formation F by rotary drilling. However, other drilling methods (e.g., directional drilling) may also be used.

A drillstring 104 is suspended within the borehole 102 and has a bottomhole assembly 106 that includes a drill bit 108 at its lower end. At the surface, the wellsite system 100 includes a platform and derrick assembly 110 positioned over the borehole 102. The platform and derrick assembly 110 includes a rotary tanle 112, a kelly 114, a hook 116 and a rotary swivel 118. The rotary tanle 112 may engage the kelly 114 at an upper end of the drillstring 104 to impart rotation to the drillstring 104. The rotary tanle 112 may be energized by a device or system not shown. The drillstring 104 is suspended from the hook 116 that is attached to a traveling block (also not shown). Additionally, the drillstring 104 is positioned through the kelly 114 and the rotary swivel 118, which permits rotation of the drillstring 104 relative to the hook 116. Additionally or alternatively, a top drive system may be used to impart rotation to the drillstring 104.

In the example depicted in FIG. 1, at the surface, the wellsite system 100 includes drilling fluid or mud 120 that may be stored in a pit 122 formed at the wellsite. A pump 124 delivers the drilling fluid 120 to the interior of the drillstring 104 via a port in the rotary swivel 118, causing the drilling fluid 120 to flow downwardly through the drillstring 104 as indicated by directional arrow 126. The drilling fluid 120 exits the drillstring 104 via ports in the drill bit 108, and then circulates upwardly through the annulus region between the outside of the drillstring 104 and a wall 128 of the borehole 102 as indicated by the directional arrows 130. The drilling fluid 120 lubricates the drill bit 108 and carries formation cuttings up to the surface as the drilling fluid 120 is returned to the pit 122 for recirculation.

The bottomhole assembly 106 of the example illustrated in FIG. 1 includes a logging-while-drilling (LWD) module 132, a measuring-while-drilling (MWD) module 134, another drillstring component 136 such as, a roto-steerable system or mud motor, and the drill bit 108.

The LWD module 132 may be housed in a drill collar 138 and may include one or more logging tools. In some examples, the bottomhole assembly 106 may include an additional LWD module and/or a MWD module as represented by reference numeral 140. As such, references throughout this description to reference numeral 132 may additionally or alternatively include reference numeral 140. The LWD module 132 may include capabilities for measuring, processing, and storing information, as well as for communicating with the surface equipment. Additionally or alternatively, the LWD module 132 may include an acoustic measuring device 142.

The MWD module 134 may be also housed in a drill collar 143 and can include one or more devices for measuring characteristics of the drillstring 104 and/or the drill bit 108. Additionally or alternatively, the MWD module 134 may include an apparatus (not shown) for generating electrical power for at least portions of the bottomhole assembly 106, for example. The apparatus for generating electrical power may include a mud turbine generator powered by the flow of drilling fluid. However, other power and/or battery systems may additionally or alternatively be employed. The MWD module 134 may include one or more tools or measuring devices such as, for example, a weight-on-bit measuring device, a torque measuring device, a vibration measuring device, a shock measuring device, a stick slip measuring device, a direction measuring device and/or an inclination measuring device.

During a drilling operation, an example acoustic tool 144 may measure formation shear slowness and/or formation compressional slowness, for example. The measured slownesses may be used to identify or quantify parameters used for reservoir characterization, decision support, radially imaging the formation, etc. The acoustic tool 144 includes a transmitter 148 and first and second receivers 150 and 152 configured to determine and/or measure slownesses of different acoustic modes at frequencies of the signals received. In addition to identifying the slownesses, the acoustic tool 144 and/or a logging and control computer and/or processing unit 154 may perform the methods described herein including the example method described in greater detail in connection with FIG. 3. More specifically, the acoustic tool 144 may cooperate with the logging and control processor or computer 154 to iteratively calculate a more accurate estimate of the slowness of the drilling fluid in the annulus to enable the acoustic tool 144 to provide more accurate measurements of formation slowness which, in turn, can be used to provide more accurate measurements of formation compressibility.

While the wellsite system 100 depicts the transmitter 148 and the receivers 150 and 152 downhole, the transmitter 148 may be positioned uphole and the receivers 150 and 152 may be positioned downhole, or the transmitter 148 may be positioned downhole and the receivers 150 and 152 may be positioned uphole, for example. Any number of transmitters (e.g., 1, 2, 3, etc.) and/or receivers (e.g., 1, 2, 3, etc.) may be used with the acoustic tool 144.

The logging and control computer 154 may receive information and/or data transmitted from the LWD module 132, the acoustic measuring device 142 and/or the MWD module 134. The logging and control computer 154 may analyze results obtained while drilling and/or while drilling is temporarily suspended, for example. Results and/or other data or information may be retrieved from and/or stored to a data store 156 and/or 158 by the logging and control computer 154.

The logging and control computer 154 may include a user interface that enables parameters (e.g., processing parameters) to be input and/or outputs to be displayed. While the logging and control computer 154 is depicted uphole and adjacent the wellsite system, a portion of or the entire logging and control computer 154 may be positioned in the drillstring 104, the bottomhole assembly 106 and/or in a remote location.

Although the components of FIG. 1 are shown and described as being implemented in a particular conveyance type, the example methods, systems and apparatus described herein are not limited to a particular conveyance type but, instead, may be implemented in connection with different conveyance types including, for example, coiled tubing, wired drillpipe, wireline and/or any other conveyance types known in the industry.

Figure 2:
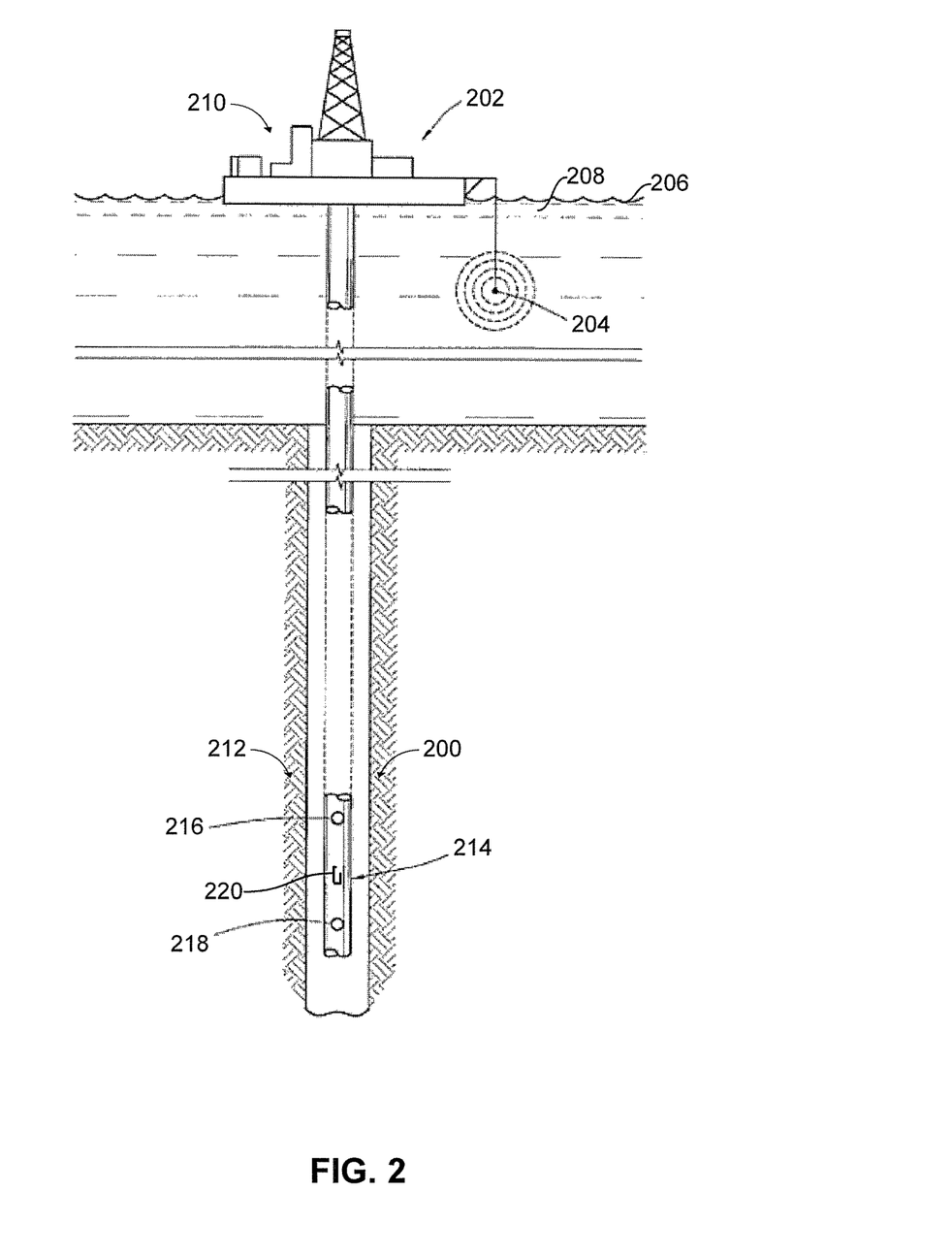
FIG. 2 depicts an example sonic logging-while-drilling tool.

FIG. 2 depicts a sonic logging-while-drilling tool 200 that may be used to implement at least a part of the LWD module 132 of FIG. 1 or which may be part of the LWD module 140 as described in U.S. Pat. No. 6,308,137, which is hereby incorporated herein by reference in its entirety. An offshore rig 202 having a sonic transmitting source or array or transmitter 204 may be deployed near a surface 206 of water 208. Additionally or alternatively, any other type of uphole or downhole source or transmitter may be provided to transmit sonic signals. In some examples, an uphole processor (not shown) may control the firing of the transmitter 204.

Uphole equipment 210 may also include acoustic receivers (not shown) and a recorder (not shown) for capturing reference signals near the source of the signals (e.g., the transmitter 204). The uphole equipment 210 may also include telemetry equipment (not shown) for receiving MWD signals from downhole equipment 212. The telemetry equipment and the recorder may be coupled to a processor (not shown) so that recordings may be synchronized using uphole and downhole clocks (not shown). In this example, a downhole LWD module (not shown) 214 includes one or more acoustic receivers 216 and 218. The acoustic receivers 216 and 218 may be coupled to a signal processor 220 so that recordings may be made of signals detected by the receiver(s) 216 and/or 218 in synchronization with the firing of the signal source (e.g., the transmitter 204).

Figure 3:
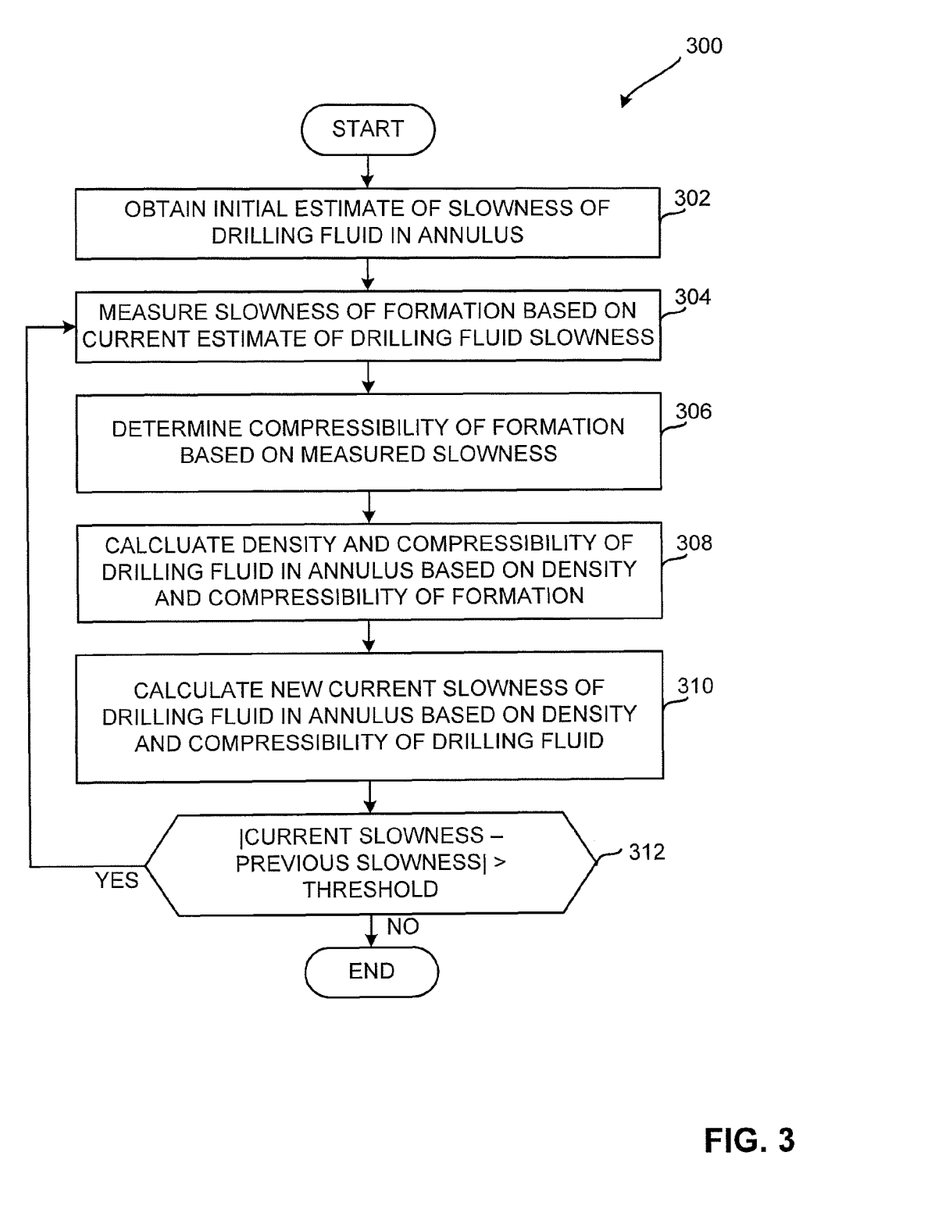
FIG. 3 depicts an example flowchart of a method that can be used to implement the examples described herein to determine drilling fluid slowness in an annulus.

FIG. 3 depicts an example flow diagram representative of an example process or method 300 that may be implemented using, for example, computer readable and executable instructions that may be used to identify optimized values for parameters in a downhole environment. The example process 300 of FIG. 3 may be performed using a processor, a controller and/or any other suitable processing device. For example, the example process of FIG. 3 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process 300 of FIG. 3 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example operations of FIG. 3 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example operations of FIG. 3 may be implemented manually or as any combination(s) of any of the foregoing techniques, for example, any combination of firmware, software, discrete logic and/or hardware. Further, although the example process 300 of FIG. 3 is described with reference to the flow diagram of FIG. 3, other methods of implementing the process 300 of FIG. 3 may be employed. For example, the order of execution of the blocks may be changed, and/or some of the blocks described may be changed, eliminated, sub-divided, or combined. Additionally, any or all of the example operations of FIG. 3 may be performed sequentially and/or in parallel by, for example, separate processing threads, processors, devices, discrete logic, circuits, etc.

Referring to FIG. 3, the example process 300 begins by obtaining an initial estimate of the slowness of the drilling fluid in an annulus (block 302). Such an initial estimate is obtained because an acoustic LWD tool (e.g., the tool 144 of FIG. 1) uses a value for the slowness of the drilling fluid in the annulus to make accurate measurements of, for example, formation slowness, formation shear slowness, formation compressional slowness and/or formation compressibility. The initial estimate at block 302 may be a value stored in a data store (e.g., one or both of the data stores 156 and 158 of FIG. 1) and that value may, for example, be based on historical and/or typical values for drilling fluid slowness.

The example process 300 then measures the slowness and/or one or more slowness values of a formation based on the current estimate of drilling fluid slowness (block 304). The slowness values may include a formation shear slowness value and/or a formation compressional slowness value. At this point, the current estimate of the drilling fluid slowness is the initial value obtained at block 302.

The example process 300 then determines the compressibility $C_F$ of the formation using the slowness measured at block 304 (block 306) and formation density $p_F$. The values for $C_F$ is deducible from the measured slowness in accordance with the well-known relationship of Equation 1 below, wherein $S_p$ relates to shear slowness and $S_s$ relates to compressional slowness. The $p_F$ may be obtained from LWD measurements and/or estimated.

$$C_F = 3S_p^2 S_s^2 / \{p_F[3S_s^2 - 4S_p^2]\} \quad \text{Equation 1}$$

Then, using the density and compressibility values for the formation obtained at block 306, the example process 300 calculates the density $p_o$ and compressibility $C_o$ of the drilling fluid in the annulus (block 308). In general, the calculations performed at block 308 correct the measured density $p_i$ and compressibility $C_i$ of the internal drilling fluid (e.g., the drilling fluid within the LWD tool 144) using the volume fraction of rock cuttings suspended in the drilling fluid in the annulus $X_R$ as set forth in Equations 2, 3 and 4 below.

$$p_o = [1 - X_R]p_i + X_R p_F \quad \text{Equation 2}$$

$$C_o = [1 - X_R]C_i + X_R C_F \quad \text{Equation 3}$$

$$X_R = \frac{\pi a^2 * ROP}{Q_i + \pi a^2 * ROP} \quad \text{Equation 4}$$

In Equation 2, the density of the internal drilling fluid $p_i$ may be determined by measuring the density of the drilling fluid at the Earth's surface prior to drilling because this density value does not vary significantly with depth.

In Equation 3, the compressibility of the internal drilling fluid $C_i$ is temperature dependent and, thus, may be measured at depth (e.g., at the depth of the tool 144). This compressibility may be deduced via a speed of sound measurement made within the drill collar 138 of the tool 144.

In Equation 4, the ROP may be provided in units of feet-per-second or meters-per-second. In addition, the variable $Q_i$ relates to the volumetric flow rate of drilling fluid into the drill collar (e.g., the drill collar of the tool 144) (e.g., in units of $ft^3$/second or $m^3$/second), and the variable "a" is the radius of the borehole.

The example process 300 then calculates a new current slowness of the drilling fluid in the annulus using the density $p_o$ and $C_o$ obtained using Equations 2, 3 and 4 above and the relationship of Equation 1 (block 310).

The example process 300 then determines the magnitude of the difference between the slowness of the drilling fluid calculated at block 310 and a previous drilling fluid slowness value (e.g., the initial estimate from block 302 or a subsequent previous calculation of slowness at block 310) and compares this difference to a threshold value (block 312). If the difference is greater than a threshold, the example process iterates by returning to block 304 to repeat operations at blocks 304 through 312. Otherwise, the example process 300 ends. While block 312 depicts the example process 300 performing iterations based on a convergence or desired accuracy of the calculated slowness of the drilling fluid in the annulus, the iterations may alternatively or additionally be based on performing the operations of blocks 304 through 310 a predetermined number of times.

Figure 4:
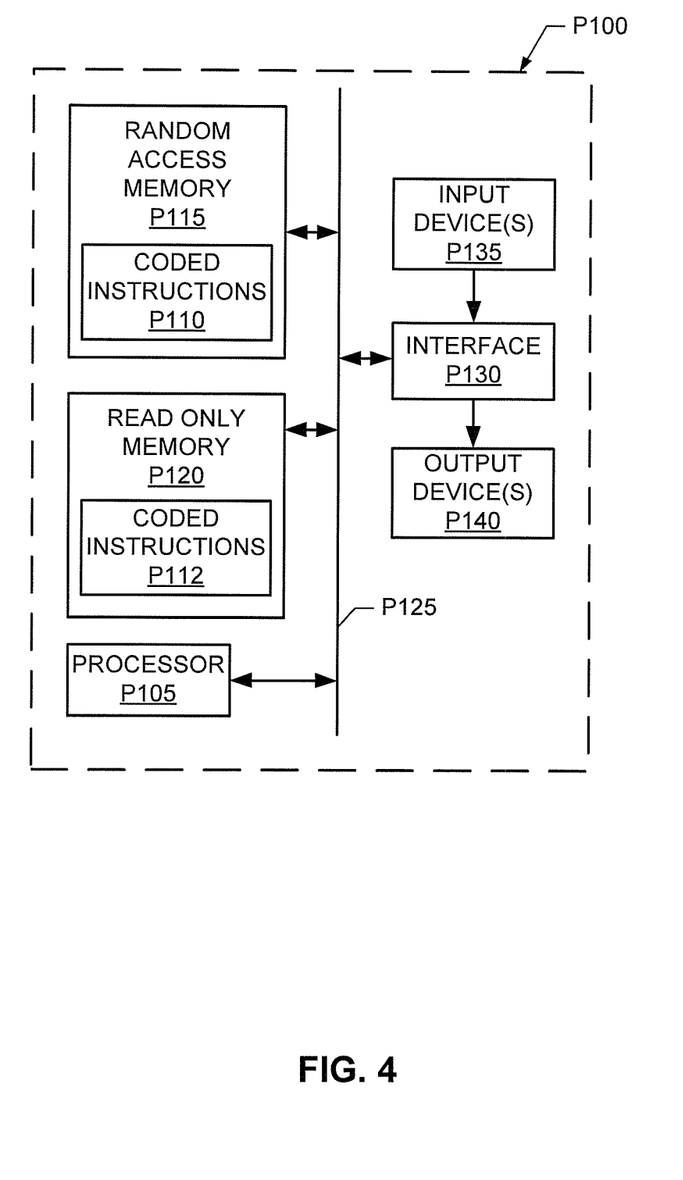
FIG. 4 is a schematic illustration of an example processor platform that may be used and/or programmed to implement any or all of the example methods and apparatus described herein.

FIG. 4 is a schematic diagram of an example processor platform P100 that may be used and/or programmed to implement to implement the logging and control computer 154 and/or any of the examples described herein. For example, the processor platform P100 can be implemented by one or more general purpose processors, processor cores, microcontrollers, etc.

The processor platform P100 of the example of FIG. 4 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method of determining slowness of drilling fluid in an annulus of a borehole in a formation, comprising:
   (a) obtaining a first slowness of the drilling fluid in the annulus;
   (b) measuring with a downhole tool slownesses of the formation based on the first slowness;
   (c) determining a first compressibility of the formation based on the slownesses of the formation and a first density of the formation;
   (d) calculating a second density and a second compressibility of the drilling fluid in the annulus based on the first density and the first compressibility; and
   (e) calculating a second slowness of the drilling fluid in the annulus based on the second density and the second compressibility.

2. The method of claim 1, wherein the slownesses of the formation comprise a compressional slowness value and a shear slowness value.

3. The method of claim 1, wherein obtaining the first slowness of the drilling fluid in the annulus comprises estimating the slowness of the drilling fluid in the annulus.

4. The method of claim 1 further comprising repeating (b) through (e) where the slownesses of the formation are measured at (b) using the slowness of the drilling fluid calculated at (e).

5. The method of claim 4 further comprising repeating (b) through (e) a predetermined number of times or until a difference between the slowness of the drilling fluid calculated at (e) and the slowness of the drilling fluid used at (b) is less than or equal to a threshold value.

6. The method of claim 1, wherein calculating the second density and the second compressibility comprises calculating a volume fraction of rock cuttings in the drilling fluid in the annulus.

7. The method of claim 6, wherein calculating the volume fraction of rock cuttings in the drilling fluid in the annulus comprises determining a rate of penetration of drilling and a flow rate of the drilling fluid in the annulus.

8. The method of claim 6, wherein calculating the second density and the second compressibility comprises determining a third density and a third compressibility of drilling fluid at the Earth's surface or within the downhole tool and using the third density, the third compressibility and the volume fraction of rock cuttings to calculate the second density and the second compressibility.

9. A system to determine slowness of drilling fluid in an annulus of a borehole in a formation, comprising:
    a downhole tool having acoustic apparatus to measure at least slownesses of the formation; and
    a processing unit to:
        (a) determine a first compressibility of the formation based on the slownesses of the formation and a first density of the formation;
        (b) calculate a second density and a second compressibility of the drilling fluid in the annulus based on the first density and the first compressibility; and
        (c) calculate a slowness of the drilling fluid in the annulus based on the second density and the second compressibility.

10. The system of claim 9, wherein the processing unit is to calculate the second density and the second compressibility by calculating a volume fraction of rock cuttings in the drilling fluid in the annulus.

11. The system of claim 9, wherein the processing unit is within the downhole tool or at the Earth's surface.

12. The system of claim 9, wherein the slownesses of the formation comprise a compressional slowness value and a shear slowness value.

13. The system of claim 12, wherein calculating the volume fraction of rock cuttings in the drilling fluid in the annulus comprises determining a rate of penetration of drilling and a flow rate of the drilling fluid in the annulus.

14. The system of claim 12, wherein the processing unit is to calculate the second density and the second compressibility by determining a third density and a third compressibility of drilling fluid at the Earth's surface or within the downhole tool and using the third density, the third compressibility and the volume fraction of rock cuttings to calculate the second density and the second compressibility.

15. The system of claim 9 wherein the processing unit is to repeat (a) through (c) and the downhole tool is to measure slownesses of the formation based on the slowness of the drilling fluid calculated at (c).

16. The system of claim 15 further comprising repeating (a) through (c) a predetermined number of times or until a difference between the slowness of the drilling fluid calculated at (c) and the slowness of the drilling fluid used by the downhole tool is less than or equal to a threshold value.

17. A logging-while-drilling tool to determine slowness of drilling fluid, comprising:
    acoustic apparatus to measure at least slownesses of the formation; and
    a processing unit to:
        (a) determine a first density and a first compressibility of the formation based on the slownesses of the formation;
        (b) calculate a second density and a second compressibility of the drilling fluid in the annulus based on the first density and the first compressibility; and
        (c) calculate a slowness of the drilling fluid in the annulus based on the second density and the second compressibility.

18. The logging-while-drilling tool of claim 17, wherein the slownesses of the formation comprise a compressional slowness value and a shear slowness value.

19. The logging-while-drilling tool of claim 17 further comprising repeating (a) through (c) a predetermined number of times or until a difference between the slowness of the drilling fluid calculated at (c) and the slowness of the drilling fluid used by the downhole tool is less than or equal to a threshold value.

20. The logging-while-drilling tool of claim 17, wherein the processing unit is to calculate the second density and the second compressibility by calculating a volume fraction of rock cuttings in the drilling fluid in the annulus.

21. The logging-while-drilling tool of claim 20, wherein calculating the volume fraction of rock cuttings in the drilling fluid in the annulus comprises determining a rate of penetration of drilling and a flow rate of the drilling fluid in the annulus.

22. The logging-while-drilling tool of claim 20, wherein the processing unit is to calculate the second density and the second compressibility by determining a third density and a third compressibility of drilling fluid at the Earth's surface or within the downhole tool and using the third density, the third compressibility and the volume fraction of rock cuttings to calculate the second density and the second compressibility.

* * * * *